United States Patent [19]

Barstow, Jr.

[11] 4,284,202

[45] Aug. 18, 1981

[54] REUSABLE CONTAINER

[75] Inventor: Norman C. Barstow, Jr., Hadley, Mass.

[73] Assignee: Hardigg Industries, Inc., South Deerfield, Mass.

[21] Appl. No.: 86,668

[22] Filed: Oct. 19, 1979

[51] Int. Cl.³ .................. B65D 6/00; B65D 6/12; B65D 6/16

[52] U.S. Cl. .................... 220/4 B; 220/73; 220/74; 220/324

[58] Field of Search ............ 220/4 B, 4 E, 72, 73, 220/74, 334, 324

[56] References Cited

U.S. PATENT DOCUMENTS

| 2,803,368 | 8/1957 | Koch | 220/4 B |
|---|---|---|---|
| 2,939,603 | 6/1960 | Young | 220/4 B |
| 3,464,579 | 9/1969 | Asenlaver | 220/4 B |
| 4,095,719 | 6/1978 | Wolf | 220/4B |

Primary Examiner—George T. Hall
Attorney, Agent, or Firm—Cushman, Darby & Cushman

[57] ABSTRACT

A reusable container is disclosed having a base and lid joined together along a tongue and groove arrangement. The base and lid include integrally formed male and female interlock portions which support the base and lid against severe impact forces. A metallic lock is used to hold the lid to the base.

7 Claims, 9 Drawing Figures

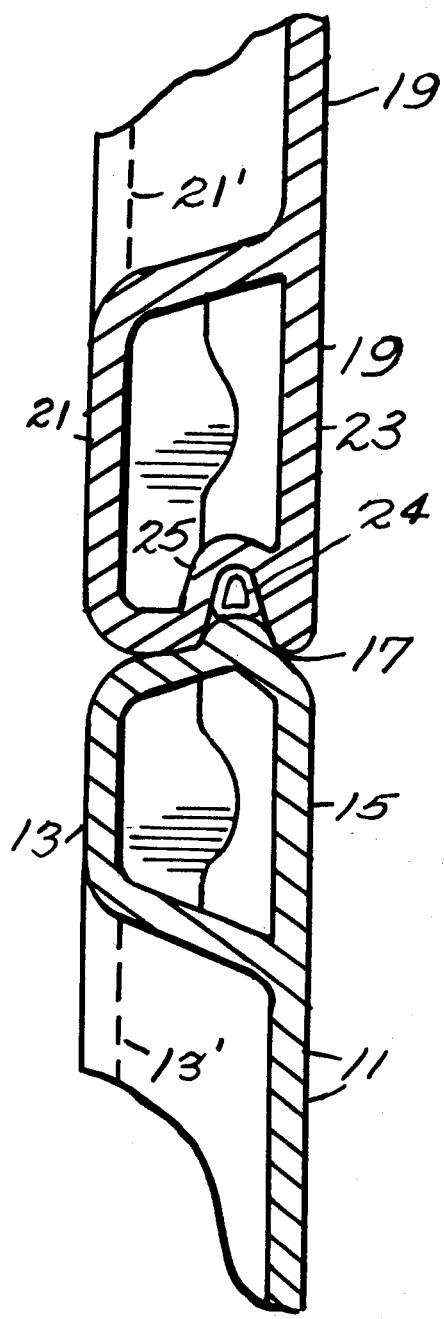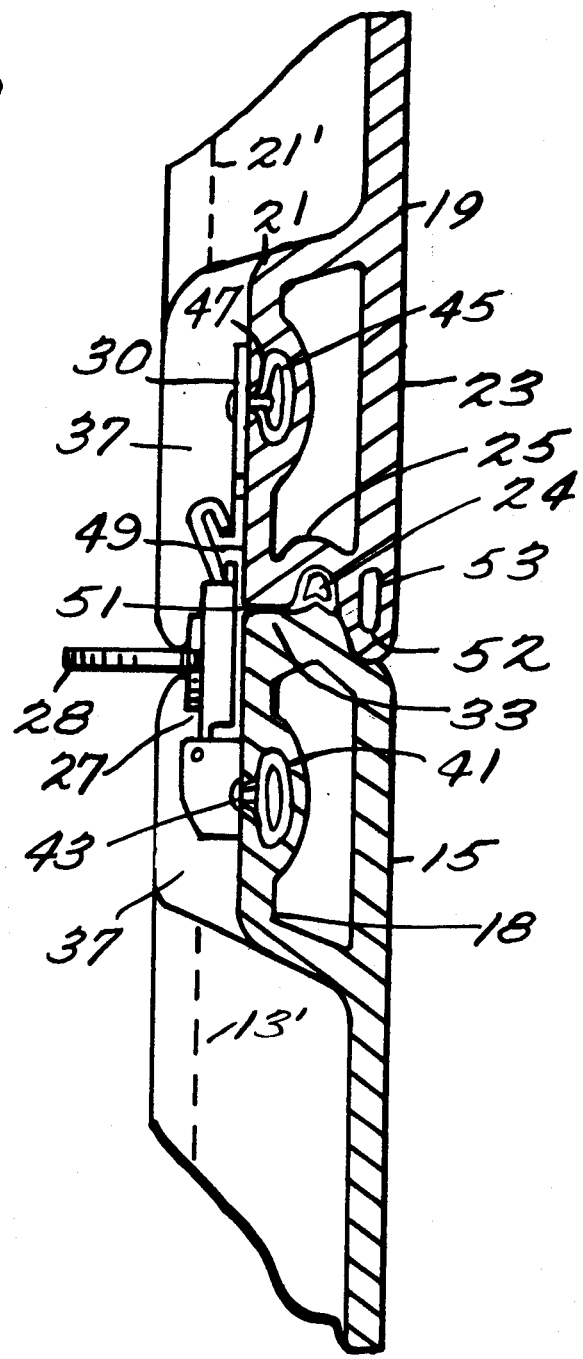

REUSABLE CONTAINER

BACKGROUND OF THE INVENTION

This invention relates to reusable containers and more specifically to reusable containers formed of plastic materials.

In the past multi-purpose reusable containers have been formed of plastic materials by, for example, a conventionally known rotational molding process. Such containers were designed to withstand temperature extremes ranging from −40° F. to +140° F., and be resistant to water, vibrations and severe impacts. An example of one such prior art reusable container is illustrated in FIGS. 1–3. As illustrated in these figures, the reusable container includes a base member 11 which has hollow sidewalls. The hollow sidewalls include an outside portion 13 and an inside portion 15 which are joined at the top of the base member in a raised tongue portion 17. The container also includes a lid member 19 having an outside wall portion 21 and an inside wall portion 23. The inside and outside wall portions 21 and 23, respectively, are joined to one another at the bottom of the lid in a grooved portion 25. The lid member 19 fits over the base member 11 such that the respective tongue and grooves mate. A gasket is positioned in the groove 25 to thereby provide a water tight fit between the lid and base. The lid and base are secured to one another by means of a set of metallic locks 27 of known design.

With this prior art rotationally molded container, the tongue and groove arrangement serves only to align the lid and base and to provide a seal for the container. Stresses normally encountered by the container when dropped or impacted are too great to maintain registration and support between the lid and base member and accordingly in the prior art container metallic shear stops support 29 were positioned at each corner of the lid 19. The shear stops were secured to the lid by means of rivets 31 as illustrated in FIGS. 1 and 3. As best illustrated in FIG. 1, the shear stops 29 extended downwardly past the top of the base member 11 to provide lateral support under impact to thereby prevent the lid from shifting off the base member 11 and shearing the locks 27.

This arrangement has a number of drawbacks. For example, in the process of making the reusable container, extra labor and materials were required which resulted in increased cost and decreased reliability of the container. The metallic shear stop supports and the plastic material forming the container were thermally dissimilar and accordingly under severe temperature extremes, unacceptable stress concentration was generated in the corners of the container particularly when the container was impacted. This caused the plastic and even the gasket material to be damaged. In addition, the shear stop supports took up space inside of the container and required a relief cut in the corners of the cushioning materials positioned within the container. Finally, while the shear stop supports can only be positioned at the four corners of the container, large containers for supporting large and heavy equipment often require greater support than is available from the four corner shear stop supports. Therefore, this prior art arrangement has proven to be less than satisfactory.

It accordingly is an object of this invention to provide an improved, reusable container.

A SHORT STATEMENT OF THE INVENTION

Accordingly this invention relates to a reusable container having a base member and a lid member wherein the lid and base members have mating tongue and groove portions at the open ends of their respective sidewalls. A gasket is positioned in the grooved portions so that when the tongue and grooves are in registration the inside of the container is sealed from the outside thereof. The reusable container includes a plurality of integrally formed registering and supporting portions placed directly under the metallic lock closure. These portions include a plurality of raised male interlocks integrally formed with the material forming the walls of the container and positioned around the top of the sidewalls of the base member. It also includes a plurality of female interlocks positioned about the bottom of the sidewalls of the lid member such that the male and female interlocks are aligned with one another when the lid is positioned over the container. The interlocks provide increased stability and integrity over the environmental extremes to which the container is subjected, eliminate the necessity of the extra step of attaching metallic supports to the container and presents the possibility of using as many interlock portions as are necessary to provide the support required depending upon the size of the reusable container.

BRIEF DESCRIPTION OF THE DRAWINGS

Other objects, features and advantages will become more fully apparent from the following detailed description of the preferred embodiment, the appended claims and the accompanying drawings in which:

FIG. 6 is a section view taken along the lines 6—6 of FIG. 4;

FIG. 7 is a section view taken along the lines 7—7 of FIG. 4;

DETAILED DESCRIPTION OF THE PREFERRED EMBODIMENT

Figure 1:
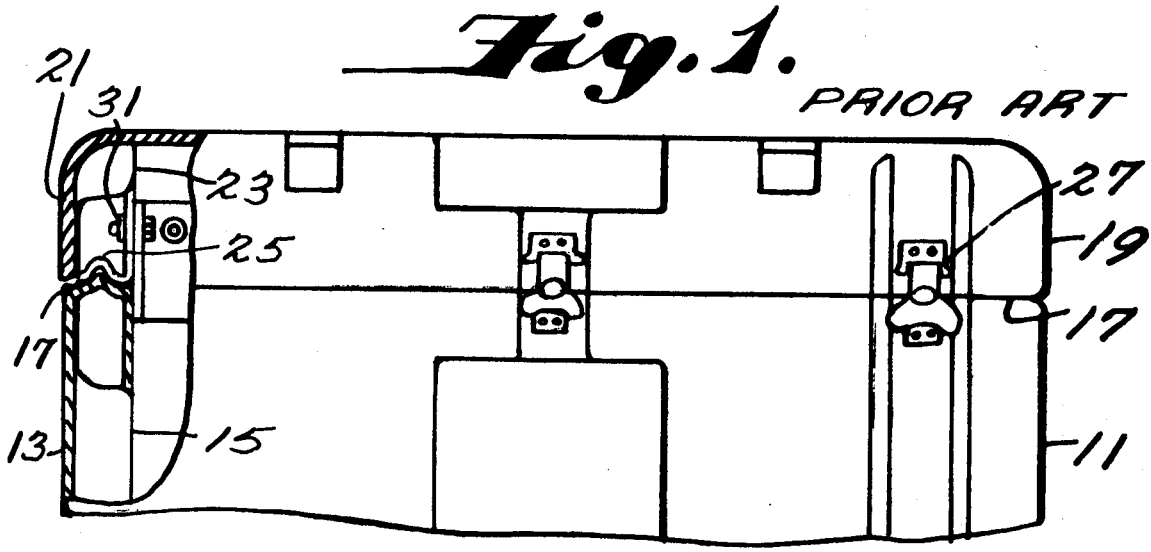
FIGS. 1–3 are an illustration of the prior art reusable container described hereinabove.
Figure 2:
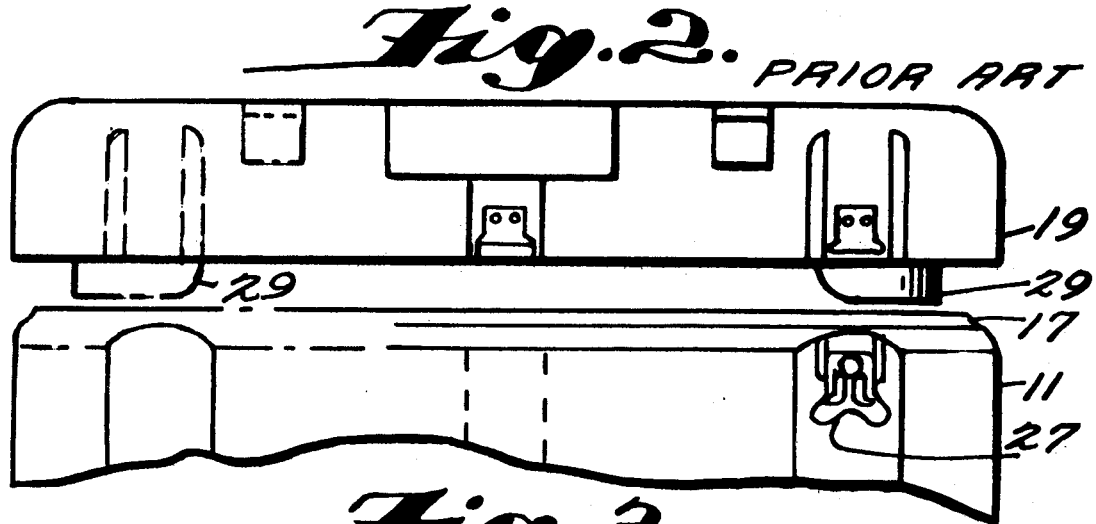
Figure 3:
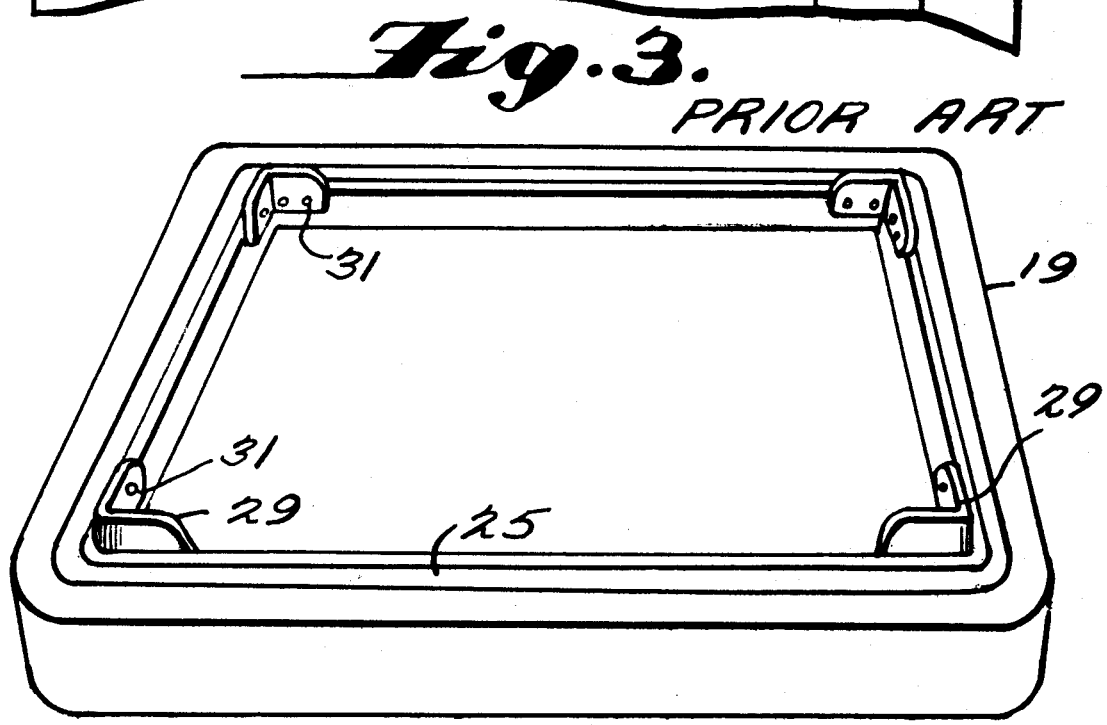
Figure 4:
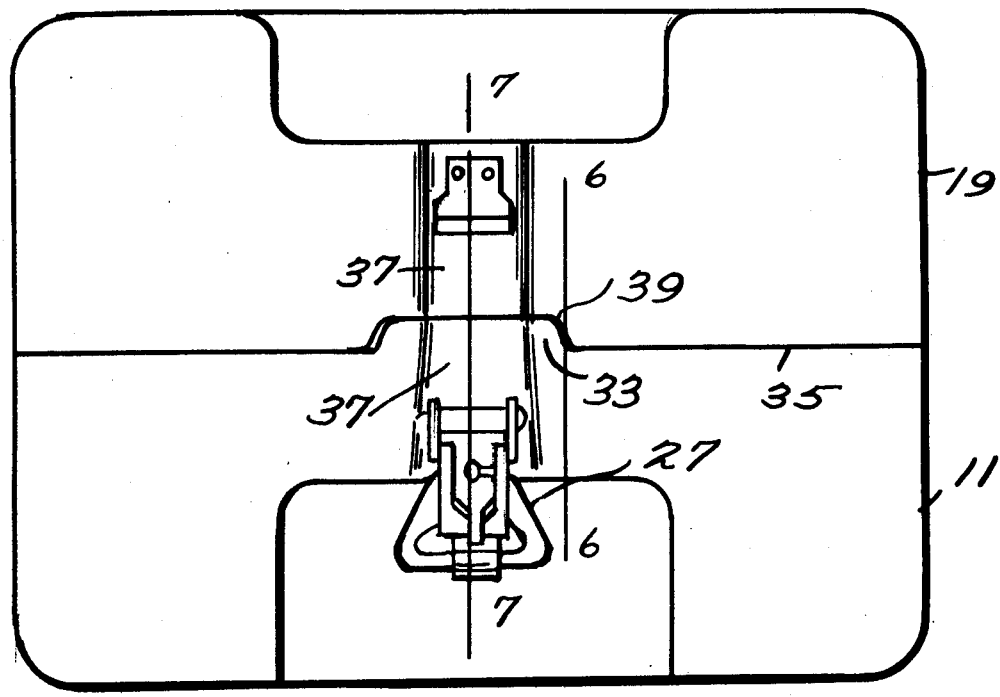
FIGS. 4 and 5 are side elevation views of a reusable container having integrally molded registration support portions.
Figure 5:
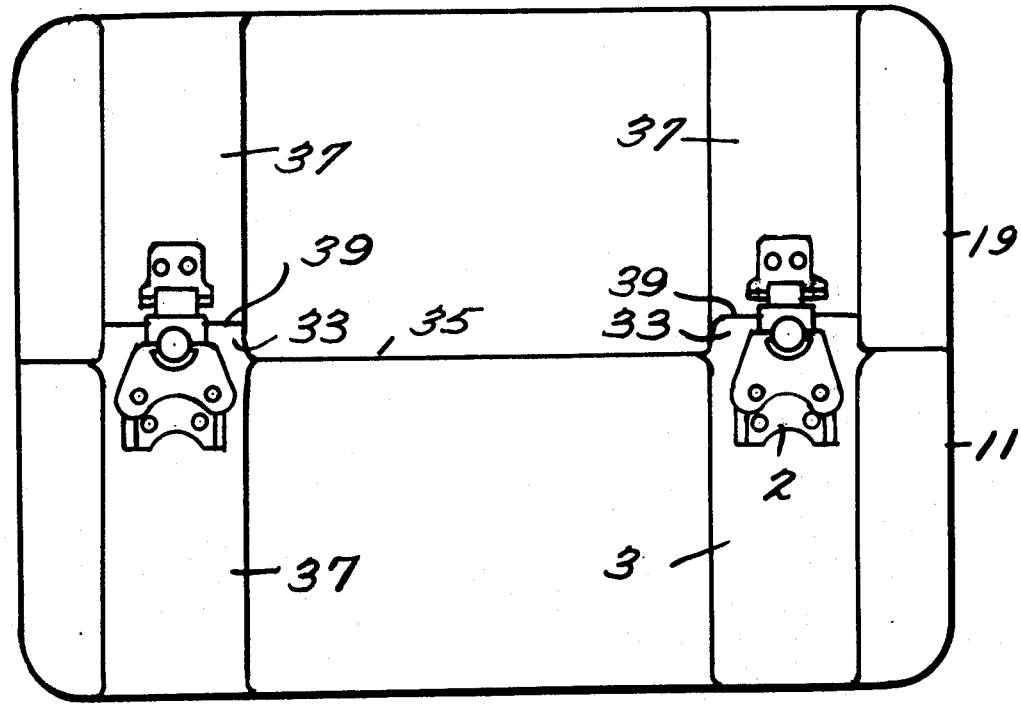

Refer now to FIGS. 4 and 5 which are side elevation views of the preferred embodiment of the reusable container of the present invention. As illustrated in FIG. 4 the container includes a base member 11 and a lid member 19. Both the base and the lid are preferably formed by a rotational molding process known in the art. As in the case of the prior art reusable container illustrated in FIGS. 1–3, the preferred container includes sidewalls having inside and outside portions which are separated from one another but which are joined together at the top of the base and bottom of the lid by tongue and groove portions, respectively. The groove supports a gasket therein. When the lid 19 is positioned over the base 11, the tongue and grooves mate with one another to seal the container. As illustrated in FIG. 4, the lid is secured to the base 11 by means of a conventional metallic lock assembly 27. Since the lock assembly 27 can be any of a number of types known in the art it will not be described herein in detail.

Advantageously, the preferred embodiment of the present invention includes a registration and support arrangement for supporting the lid 19 with respect to the base 11 under severe impact forces and over an extreme range of environmental conditions. The registration and support arrangement includes a male interlock portion 33 which extends upwardly from a line 35 which defines the plane of the junction of the outside wall portion of the lid and base. The specific configuration of the male interlock portion of the base 11 will be more fully described in connection with FIGS. 6 and 7. Preferably the male interlock portion 33 has a recessed portion 37 in which the lock assembly 27 is positioned when closed so that forces directed along the side surface of the container will not shear off or otherwise damage the metallic lock assembly. Thus by cradling the metallic lock assembly in the recess 37 the reliability and longevity of the container is increased.

The lid 19 has a recessed female interlock position 39 which as illustrated is recessed upwardly into the lid from the plane 35 of the junction of the outer wall portions of the container. Preferably the recessed female portion 39 and the raised male portion 33 have shoulders which extend inwardly at least halfway to the inside wall of the container to provide a strong and substantial support surface for withstanding high impact forces generated when the container is dropped or otherwise impacted. The lid 19 also has a recessed portion 37 for receiving the lock arm of lock assembly 27 when the lock is secured. As aforementioned, the purpose for this recessed portion is to cradle the lock so that forces directed along the side surface of the container will not result in damage to the lock.

Refer now to FIG. 5 which is an illustration of a reusable container of the present invention having a plurality of male and female interlock portions on one side of the container and showing the metallic locks in the closed, secured position. FIG. 5 merely illustrates the adaptability of the male and female interlock system of the present invention to varying size containers where as many male and female interlock portions are provided in a container as are necessary to support against separation of the lid 19 from the base 11 due to impact forces. The number of such male and female interlocks can be determined by calculation but preferably is determined on an experimental basis depending on the size of the container, the impact forces which the container must sustain and the environmental extremes which the container will experience.

As illustrated, the section of FIG. 6 is of the sidewall of the base 11 and lid 19 along a portion of the reusable container not having the male and female interlock portions. Specifically, the base member 11 is shown having an outside wall 13 and an inside wall 15 which are joined together at the top of the lid in a raised tongue portion 17. While the section illustrated shows the outside wall portion 13 and the inside wall portion 15 terminating in a single wall portion 15, it should be understood that the wall portions 13 and 15 may be separated over the entire depth of the container as illustrated by the dotted line 13'. The lid member 19 is shown having an outside wall portion 21 and an inside wall portion 23. The outside and inside wall portions 21 and 23 are joined to one another at the bottom of the lid in a grooved portion 25. The grooved portion is in alignment with the tongue 17 of the base but has a substantially greater depth than the height of the tongue in order to permit room for a gasket 24. The gasket may be of any desired material depending upon the environmental conditions as well as the degree of sealing desired for the container. It should be understood that while the outside wall portion 21 and inside wall portion 23 are joined together to form a single wall 19, the wall portions 21 and 23 could be separated from one another over the entire height of the lid as illustrated by the dotted line 21'.

As illustrated in FIG. 6, the downwardly extending lip portions of the groove 25 rest on the curvelinear outwardly sloping bottom portion of the groove 17. This provides some support as well as, in conjunction with the gasket 24, a seal for the container.

Refer now to FIG. 7 which is a section view taken along the line 7—7 of FIG. 4. As illustrated, the base member has an outer wall portion 13 and an inner wall portion 15 with the outer wall recessed inwardly toward the inner wall 15 to form a protective cradle for the metallic lock 27. When the container is closed the turn arm 28 of the lock 27 is rotated downwardly into the recess 37 to protect the lock 27 from lateral shear impact forces. The lock 27 is secured to the base by means of an embedded metallic rivet receptor 41 and a rivet 43. The rivet receptor is embedded during the molding process and accordingly cannot work its way free through vibration and impact stress forces. The lock receptor 30 is secured to the lid 19 by a second rivet receptor 45 which is also embedded in the plastic material forming the lid during the rotational molding process. The lock receptor 30 is secured to the rivet receptor 45 by means of a rivet 47.

As illustrated, the outside wall 13 of the base is joined to the inside wall portion 15 thereof in a raised male interlock portion 33. The raised male interlock portion 33 has a shoulder which extends upwardly to about the height of the top of the tongue 17 illustrated in FIG. 6 and extends inwardly from the outside surface of the container to at least about halfway to the inside wall of the container. In the preferred embodiment, as illustrated in FIG. 7, the shoulder extends over a surface area from the outside of the container to about the outside surface of the inside wall 15. This surface area is important because it provides a very strong support base for withstanding high impact forces while the container is in use.

The lid of the container has an outside wall portion 21 which is also recessed to permit cradling of the lock 27 therein. The outside wall portion 21 and the inside portion 23 are adjoined to one another at the bottom of the lid by a grooved portion 25 in the upwardly recessed female interlock portion 49. As shown, the upwardly recessed female interlock portion is substantially level with the gasket 24 and has a relatively flat surface 51 at the bottom thereof. At the inside open end of the groove, a lip 52 extends downwardly past the shoulder 33 of the base and provides a sealing engagement therewith. As illustrated, because of the distance which the plastic material must flow during the molding process, there is often formed a channel or a series of holes 53 in the lip 52 which increase the likelihood of pinhole air leaks in the container. Such channels or holes are eliminated on the outside of the gasket because of the recessed female portion 49. Thus the female shoulder 49 is thick and solid and has no porosity and this substantially eliminates leaks in the plastic walls of the container near the bottom of the lid.

Figure 8:
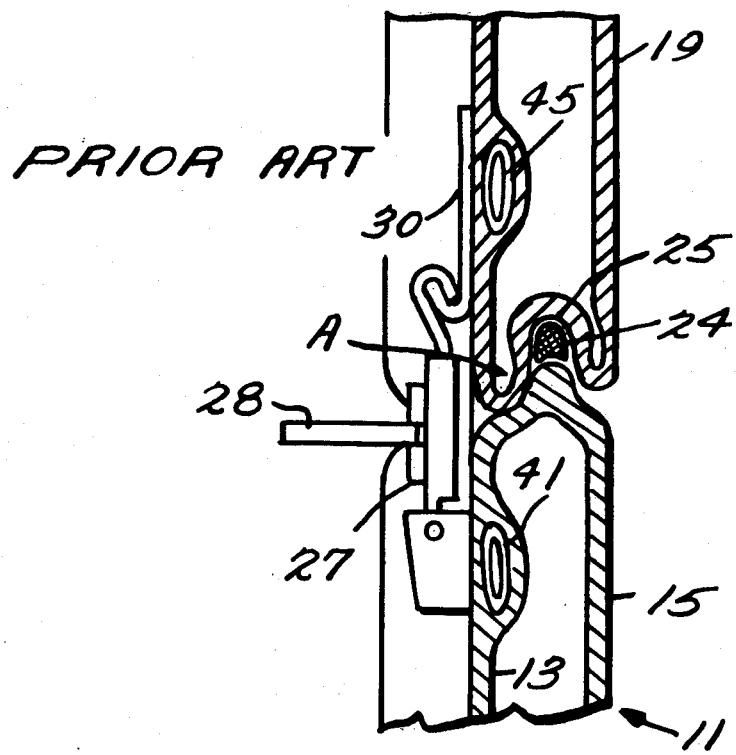
FIG. 8 is a section view corresponding to that of FIG. 7 showing the prior art tongue and groove arrangement.

Refer now to FIG. 8 which is a cross-section of the prior art container at the lock. As illustrated, the lock is secured to the base by means of the rivet receptor 41 which is embedded in the plastic. The lock receptor 30 is secured to the lid by means of a rivet receptor 45 which is embedded in the lid. The base is shown having a pair of sidewall portions terminating at the top of the base in an upwardly extending groove. The lid also has a pair of sidewalls which terminate at its bottom in a groove having a gasket 24 therein. In this prior art container, the bottom outside portion of the lid rests on a rather large radius of plastic material which forms the top of the base so that when the lock 27 pulls the lid and base together, it causes the respective base and lid to roll inwardly to thereby minimize the seating effect of the gasketed tongue and groove arrangement. Further, in the prior art the base portion of a lid was molded very thin in the area indicated by the arrow A because of the long and narrow passage in which the plastic material had to flow. The thin plastic in this area was frequently porous thereby causing pinhole air leaks in the container which had to be sealed by a second subsequent sealing process. The drawbacks to this relatively weak porous prior art structure have been overcome by the improved male-female interlock structure illustrated in FIG. 7. Thus in FIG. 7 roll-in of the base and lid portions when locked in prevented because of the shoulder 33 and the wide base of the lid 49 making substantially flat contact with one another. In addition, because of the raised female portion 49, the long narrow passage of the prior art is eliminated thereby decreasing the porosity and hence decreasing the probability of pinhole leaks in the container.

Figure 9:
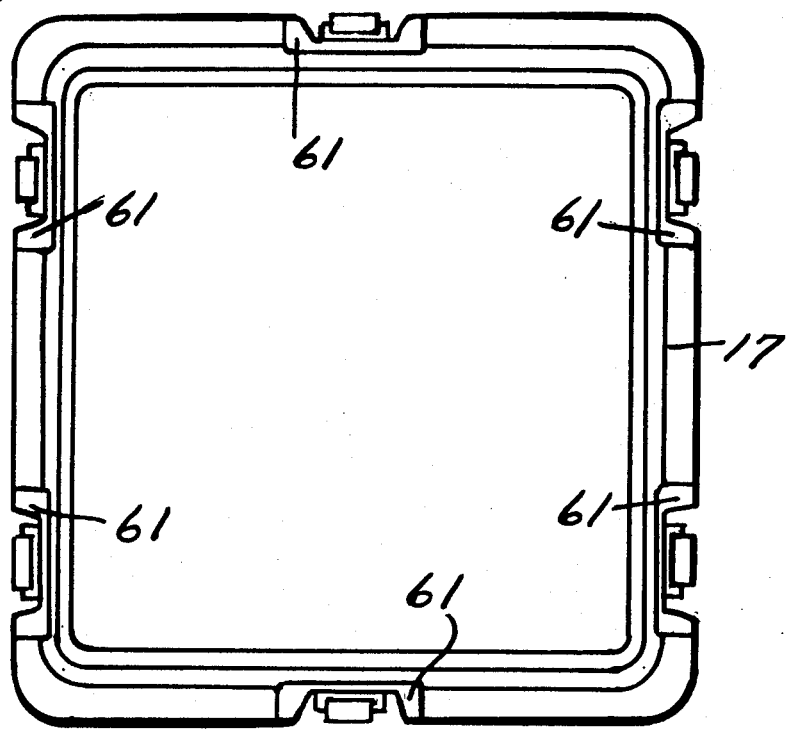
FIG. 9 is a plan view showing a plurality of registration support portions on the top of the base of the container.

Refer now to FIG. 9 which is a plan view of the base of a typical reusable container. There is shown six male interlock portions 61 positioned about the top of the base with each of the interlocks being joined to one another by means of the groove 17 therebetween. As illustrated by FIG. 9, as many male and female interlocks may be provided in the container as is necessary depending of course upon the anticipated severity of impacts to be experienced by the container, the environmental conditions and the anticipated lifetime of the container.

While the present invention has been disclosed in connection with a preferred embodiment thereof it should be appreciated that there may be other embodiments which fall within the spirit and scope of the invention as defined by the appended claims. For example, the widewall structure could be formed of solid walls rather than hollow walls and could be formed of any moldable material desired. In the preferred embodiment polyethylene is used, however, other more difficult to process materials such as polypropolene, crosslinked polyethylene and even moldable metallic materials could be used. The reason for this is that the formation of the male and female interlocks integral with the container results in substantially less working of the reusable container and hence eliminates the need for substantial secondary operations on difficult to work with materials.

What is claimed is:

1. A reusable container comprising:
   a plastic base member having a bottom and sidewalls, said sidewalls being hollowed and having a plastic lid member having a top and sidewalls, said sidewalls being hollowed and having inside and outside portions, said lid and base members having mating raised tongue and recessed groove portions at the open ends of their respective sidewalls;
   a gasket positioned in said groove portion;
   means for registering and supporting said lid and base with respect to one another including one of said base and lid members having at least one raised male interlock portion at the open end of at least one of said sidewalls, and the other of said base and lid members having at least one mating female interlock portion at the open end of at least one sidewall and being aligned with said male interlock member; and
   locking means for holding said lid member against said base member.

2. The container of claim 1 wherein said registering and supporting means further comprises said at least one male interlock portion having a shoulder formed on the outside wall portion thereof, said shoulder being raised with respect to the open end of said sidewalls, and said female interlock portion having a recessed shoulder on its outside wall thereof and mating with said male interlock means.

3. The container of claim 2 wherein said male interlock portion has a height substantially equal to the height of said groove and said female interlock portion being recessed to substantially the level of said gasket.

4. The container of claim 2 wherein said male interlock portion has a shoulder with a substantially flat top surface formed on the outside portion of said wall and extending inwardly to at least about half-way to said inside wall portion of said wall.

5. A reusable container comprising a base member having a bottom and sidewalls,
   a lid member having top and sidewalls, said lid and base members having mating raised tongue and recessed groove portions at the open ends of their respective sidewalls;
   a gasket positioned in said groove portion;
   means for registering and supporting said lid and base with respect to one another including one of said base and lid members having at least one raised male interlock portion at the open end of at least one of said sidewalls, and the other of said base and lid members having at least one mating female interlock portion at the open end of at least one sidewall and being aligned with said male interlock member; and
   locking means for holding said lid member against said base member.

6. The container of claim 5 wherein said registering and supporting means further comprises at least one male interlock portion having a shoulder formed on the outside portion thereof, said shoulder being raised with respect to the open end of said sidewalls and extending inwardly to at least about halfway to the inside of said wall, and said female interlock portion having a recessed shoulder on its outside wall thereof and mating with said male interlock means.

7. The container of claim 6 wherein said male interlock portion has a height substantially equal to the height of said groove and said female interlock portion being recessed to substantially the level of said gasket.

* * * * *